(12) United States Patent
Huang et al.

(10) Patent No.: US 11,251,690 B2
(45) Date of Patent: Feb. 15, 2022

(54) SYSTEMS, METHODS, AND APPARATUS FOR DEAD-TIME CONTROL IN RESONANT CONVERTERS

(71) Applicants: Yu Ling Huang, Port Coquitlam (CA); Gueorgui Iordanov Anguelov, Burnaby (CA)

(72) Inventors: Yu Ling Huang, Port Coquitlam (CA); Gueorgui Iordanov Anguelov, Burnaby (CA)

( * ) Notice: Subject to any disclaimer, the term of this patent is extended or adjusted under 35 U.S.C. 154(b) by 0 days.

(21) Appl. No.: 16/880,992

(22) Filed: May 22, 2020

(65) Prior Publication Data

US 2021/0367501 A1    Nov. 25, 2021

(51) Int. Cl.
*H02M 3/335* (2006.01)
*H02M 1/00* (2006.01)
*H02M 3/00* (2006.01)

(52) U.S. Cl.
CPC .......... *H02M 1/0032* (2021.05); *H02M 3/01* (2021.05); *H02M 1/0058* (2021.05); *H02M 3/33538* (2013.01); *H02M 3/33546* (2013.01); *H02M 3/33573* (2021.05); *H02M 3/33592* (2013.01)

(58) Field of Classification Search
CPC ........ H02M 1/083; H02M 3/01; H02M 3/335; H02M 3/33569; H02M 3/33573; H02M 3/33576; H02M 3/33592; H02M 1/0058; H02M 1/0032; H02M 1/0035; H02M 3/33507; H02M 3/33538; H02M 3/33546
See application file for complete search history.

(56) References Cited

U.S. PATENT DOCUMENTS

| | | | |
|---|---|---|---|
| 2013/0229829 A1* | 9/2013 | Zhang | H02M 3/33546 363/16 |
| 2016/0285377 A1* | 9/2016 | Takagi | H02M 3/33584 |

\* cited by examiner

*Primary Examiner* — Gary L Laxton

(57) ABSTRACT

Methods and systems for controlling an output voltage of a resonant converter during a light load condition. One such method includes generating a normalised conduction time of the resonant converter that varies inversely with a switching frequency of the resonant converter by continuing to operate the resonant converter in a Pulse Frequency Modulation mode at a low switching frequency that is similar to the resonant frequency. The method also includes controlling a power level delivered to a secondary winding of a transformer positioned between a resonant tank and an output rectifier of the resonant converter by regulating the normalised conduction time, where the delivered power level is variable based on load conditions. The method further includes generating an output voltage using the output rectifier wherein the magnitude of the output voltage corresponds to the power level delivered to the secondary winding.

14 Claims, 13 Drawing Sheets

SYSTEMS, METHODS, AND APPARATUS FOR DEAD-TIME CONTROL IN RESONANT CONVERTERS

TECHNICAL FIELD

The present disclosure relates to resonant converters, and in particular, controlling dead time to regulate output voltage in resonant converters.

BACKGROUND

Resonant converters, including inductor-inductor-capacitor ("LLC") converters are widely used in various applications, including power supply and conversion applications. Resonant converters include power switches on a power switch bridge that are turned on and off with a specified duty cycle, such as a 50% duty cycle, and a specified switching frequency. A DC voltage may be applied to the power switch bridge to generate a square wave voltage that is then applied to the resonant network. An output DC voltage of the resonant converter may be regulated by operating the power switches in a frequency-controlled mode, which is known as Pulse Frequency Modulation ("PFM"). Based on network characteristics of the resonant network, the output voltage of the resonant converter may be regulated by varying the switching frequency in relation to a resonant frequency of the resonant network. An operating point may be selected such that the higher the switching frequency the lower the output voltage and the lower the switching frequency, the higher the output voltage.

In resonant converters, the parasitic capacitors of the switches may be discharged prior to turning on the switches, resulting in lossless switching and known as Zero-Voltage Switching (ZVS). If the parasitic capacitors are not discharged the power switches turn on at high voltage resulting in significant power loss.

There exists a continuing desire to advance and improve technology related to resonant converters.

SUMMARY

According to one aspect, there is provided a method for controlling an output voltage of a resonant converter during a light load condition. The method may include generating a normalised conduction time of the switches of the resonant converter that varies inversely with a switching frequency of the resonant converter by continuing to operate the resonant converter in a Pulse Frequency Modulation mode with the switching frequency similar in magnitude to a resonant frequency of the resonant converter, while increasing a dead time of power switches of the resonant converter to a point where power delivered to a secondary winding of the resonant converter is at a low power level. The method may also include controlling a power level delivered to a secondary winding of a transformer positioned between a resonant tank and an output rectifier of the resonant converter by regulating the normalised conduction time of the switches. The delivered power level may be variable based on load conditions. The method may also include generating an output voltage using the output rectifier. The magnitude of the output voltage may correspond to the power level delivered to the secondary winding.

The method may further include determining the dead time based on a comparison of a resonant period and a switching period. The resonant period may be a period of a mutual resonance of a resonant tank of the resonant converter and the switching period may be a maximum switching period that the resonant converter is designed for.

The normalised conduction time may be set to half of the resonant period if the resonant period is longer than the switching period for letting power switches work at a Zero Voltage Switching condition.

If the resonant period is shorter than the switching period, the normalised conduction time may be set to a value sufficiently large such that the power switches remain operable when the switching frequency is as low as the resonant frequency.

The dead time may be set at a fixed value which is greater than the lower of 700 nS and 10% of the period of the resonant frequency of the resonant tank.

The low power level may include a zero-power level.

Increasing the switching frequency may decrease the normalised conduction time. Decreasing the switching frequency may increase the normalised conduction time.

A zero normalised conduction time may be achievable at a switching frequency period that is According to another aspect, there is provided a resonant converter system for providing a controllable output voltage during a light load condition. The system may include a DC output port for coupling to a load and a switching network comprising power switches. The power switches may have a controllable normalised conduction time and may be operable with a large dead time. The switching network may be coupled to a DC input for generating a wave voltage and set to operate in a Pulse Frequency Modulation mode with a variable switching frequency that approaches a resonant frequency of the resonant converter. The system may also include an output rectifier for converting an AC voltage to an output DC voltage. The output rectifier may be coupled to the DC output. The system may also include a resonant tank positioned between and coupled to the switching network and the output rectifier. The resonant tank may have the resonant frequency. The system may further include a transformer positioned between the resonant tank and the output rectifier. The transformer may have a primary winding coupled to the resonant tank and a secondary winding coupled to the output rectifier for delivering power to the output rectifier.

Power delivered to the secondary winding may be variable due to the normalised conduction time of the power switches varying inversely with the switching frequency.

The large dead time of the power switches may be sufficiently large such that power delivered to the secondary winding is at a low power level.

The dead time may be greater than the lower of 700 nS or 10% of the period of the resonant frequency of the resonant tank.

The dead time of the power switches may be based on a comparison of a secondary resonant period and a switching period. The secondary resonant period may be a period of a mutual resonance of a resonant tank of the resonant converter and the switching period may be a maximum switching period that the resonant converter is designed for.

The normalised conduction time may be set to half of the secondary resonant period if the secondary resonant period is longer than the switching period such that power switches are operable at a Zero Voltage Switching condition.

If the secondary resonant period is shorter than the switching period, the dead time may be set to a value sufficiently large such that the normalised conduction time of the power switches is equal or lower than a half of the secondary resonant period.

The low power level may include a zero power level.

The system may include at least one of an LLC resonant converter, an LCC resonant converter and an LCLC resonant converter.

BRIEF DESCRIPTION OF THE DRAWINGS

In the accompanying drawings, which illustrate one or more example embodiments,

FIG. 1b is a circuit diagram of a resonant converter with two switches turned on, according to the embodiment of FIG. 1a;

FIG. 1c is a circuit diagram of a resonant converter with two other switches turned on, according to the embodiment of FIG. 1a;

FIG. 4 is a graphical depiction of a standard switching pattern of Mosfets of the resonant converter of FIG. 1a;

DETAILED DESCRIPTION

Directional terms such as "top", "bottom", "upper", "lower", "left", "right", and "vertical" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", "coupling", and "couplable" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. The term "couplable", as used in the present disclosure, means that a first device is capable of being coupled to the second device. A first device that is communicatively couplable to a second device has the ability to communicatively couple with the second device but may not always be communicatively coupled.

Figure 1A:
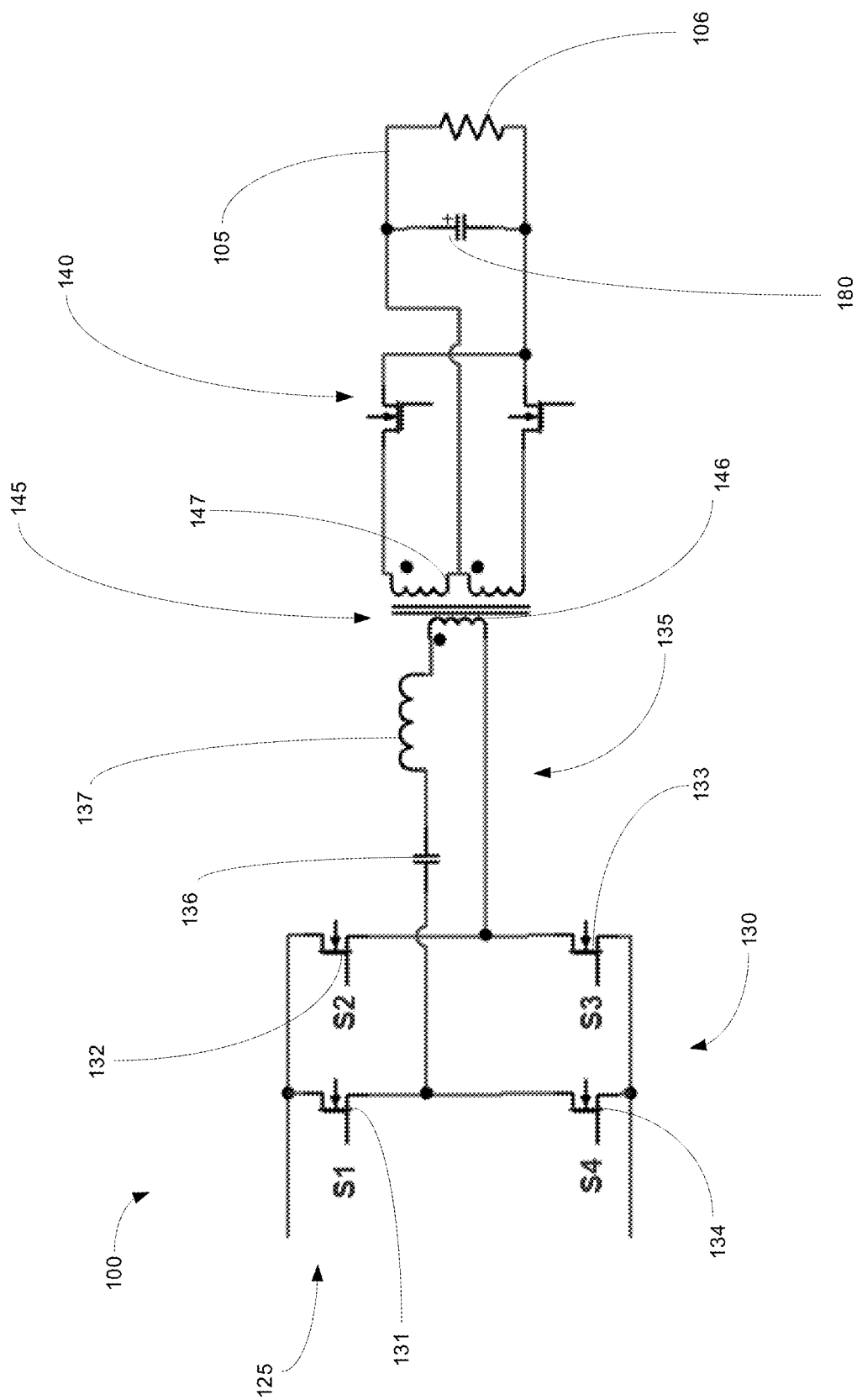
FIG. 1a is a circuit diagram of a resonant converter, according to one embodiment.

Resonant converters are widely used in various power supply applications. Referring to FIG. 1a, an example of a resonant converter is shown at 100. The resonant converter may include a resonant tank 135, such as an inductor-capacitor resonant network. The resonant tank 135 may be coupled on the input side to a switching network 130. The switching network may be coupled to a DC input 125. On the output side, the resonant tank 135 may be coupled through a transformer 145 to an output rectifier 140, a filter 180 and an output load 106. A primary winding 146 of the transformer 145 may be inserted into the resonant tank 135 and a secondary winding 147 of the transformer 145 may be connected to the output rectifier.

The switching network may be, in typical applications, a bridge of four switches (Full Bridge Topology) or two switches (Half Bridge Topology). The switches may turn on and off alternately with a set switching frequency and generate a square wave voltage that may be applied onto the resonant tank. Following rectification by the rectifier bridge, an isolated DC voltage may be obtained. A DC gain of the resonant converter is provided by a ratio of the DC output voltage and the DC input voltage. The DC gain may be regulated by varying a switching frequency in a control mode such as the Pulse Frequency Modulation (PFM). For example, increasing the switching frequency may reduce the DC gain, thus reducing the output voltage. Decreasing the switching frequency may increase the DC gain, thereby increasing the output voltage.

A feature of resonant converters is that the parasitic capacitors of the switches may be discharged prior to turning on the switches resulting in lossless switching called Zero-Voltage Switching (ZVS). If the parasitic capacitors are not discharged, the switches may turn on at high voltage, referred to as Hard Switching, which may result in significant power loss.

A practical issue for LLC resonant converters is that the switching frequency may not be increased to an infinite value, thereby limiting the controllable range of the output voltage. This issue may be worsened when accounting for the parasitic capacitances of resonant inductors, transformers and power switches that store energy. Therefore, even when operating at very high switching frequencies, there may be excessive power delivered to the output. In zero-load or low load conditions, an undesirable increase in the output voltage may be experienced. The increase may be outside a controllable range of the output voltage.

One method in the prior art for addressing the limited controllable range of the output voltage is known as Burst Mode Control. Burst Mode Control includes turning the switches off completely when the output voltage goes above a maximum threshold and resuming the switching when the output voltage hits a minimum threshold. As a result of this control method the output voltage fluctuates between the minimum and the maximum thresholds. Such voltage fluctuations may be undesirable in many practical applications, such as telecom.

Another method in the prior art for addressing the limited controllable range of the output voltage is the phase-shift method. The phase-shift method is applied to full bridge topologies, which have four power switches. The principle of the phase-shift method is to phase-shift the switching instances of a pair of the power switches in relation to the switching instances of the other pair. All the switches operate at 50% duty cycle but the phase shift between the pairs produces a quasi-square wave voltage at a bridge converter's output. This quasi-square wave voltage is referred to as a pulse width modulated (PWM) wave. By increasing the phase-shift the zero-load/light-load output voltage decreases and vise versa, allowing for efficient control. This method may be relatively free of output voltage fluctuations but has significant switching losses at high frequencies due to hard switching of the power switches. This method is applicable for full bridge topologies, making it impractical for lower power applications.

The present disclosure provides for changing the dead time of power switches to a fixed large value when the resonant converter is at a light/no-load condition. Since the power switches' turning on/off dead time has been changed to a large value while the resonant converter continues operating in PFM mode, a normalised conduction time (NCT) of the power switches may become variable with the switching frequency. A lower duty cycle or even a zero-duty cycle may be achievable at high switching frequencies, resulting in very low or even zero power deliverance to an output rectifier of the resonant converter, and may allow the output voltage of the resonant converter to be controlled, even to very low values approaching zero.

In the present disclosure, the NCT describes a conduction time of a power switch normalised to a switching period. During a conduction time of a power switch, energy is transferred from an input source, such as a DC input, to a resonant tank and subsequently a load. The larger the NCT, the greater the amount of energy that may be transferred to the load, thereby increasing the output voltage. The lower the NCT, the lower the amount of energy that may be transferred to the load, thereby decreasing the output voltage.

Figure 2:
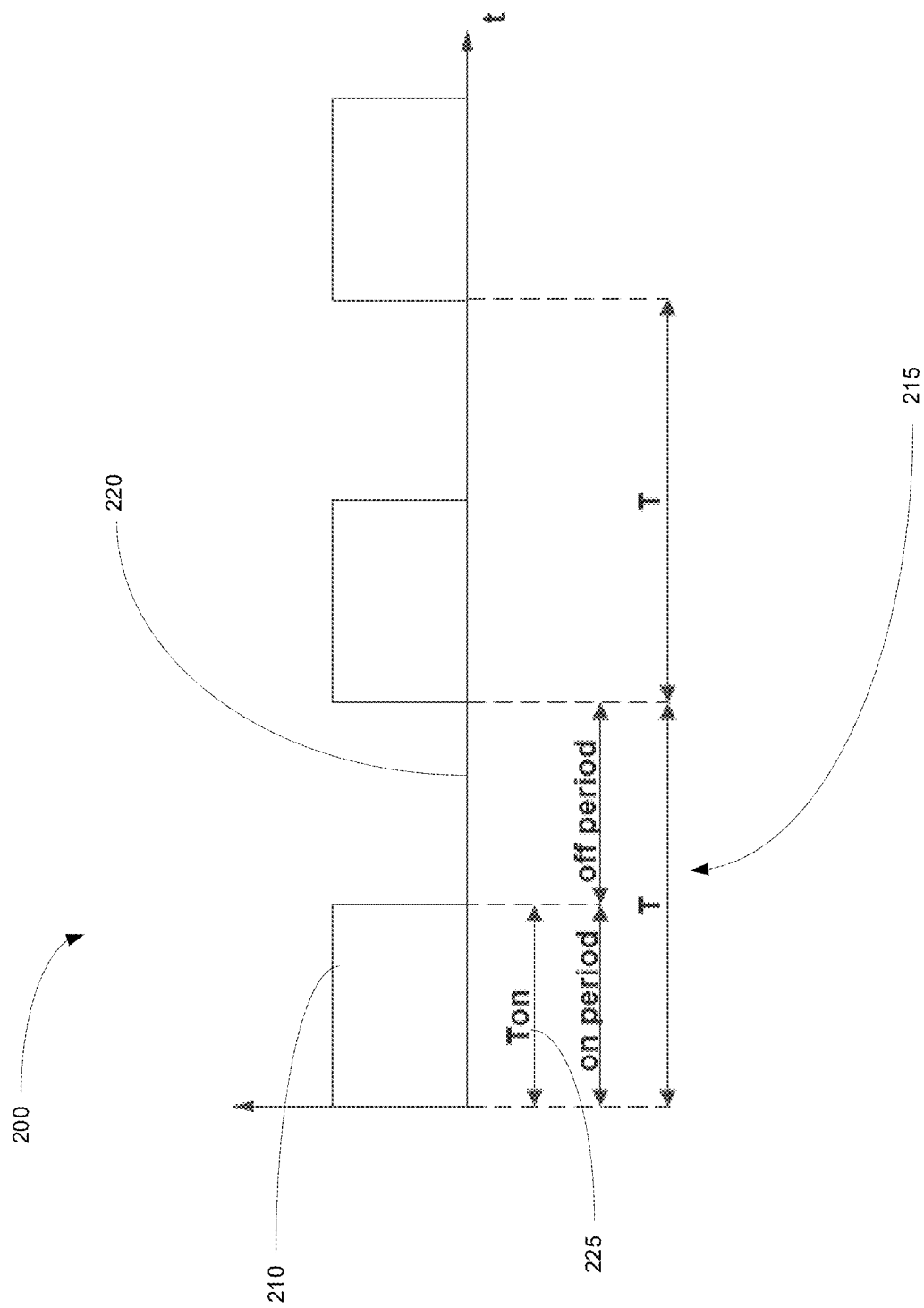
FIG. 2 is a graphical depiction of a standard switching pattern of the power switches of a resonant converter, according to one embodiment.

Referring to FIG. 2, a standard switching pattern of a resonant converter is shown at 200. The power switches are turned on for a half period 210 of the switching frequency and off for a half period 220. Therefore, $$T_{on}=0.5/T$$

$$NCT=T_{on}/T=T/2$$

where Ton is the Mosfet turn on time 225 and T is the switching period 215.

The switching frequency equals 1/T.

Figure 3:
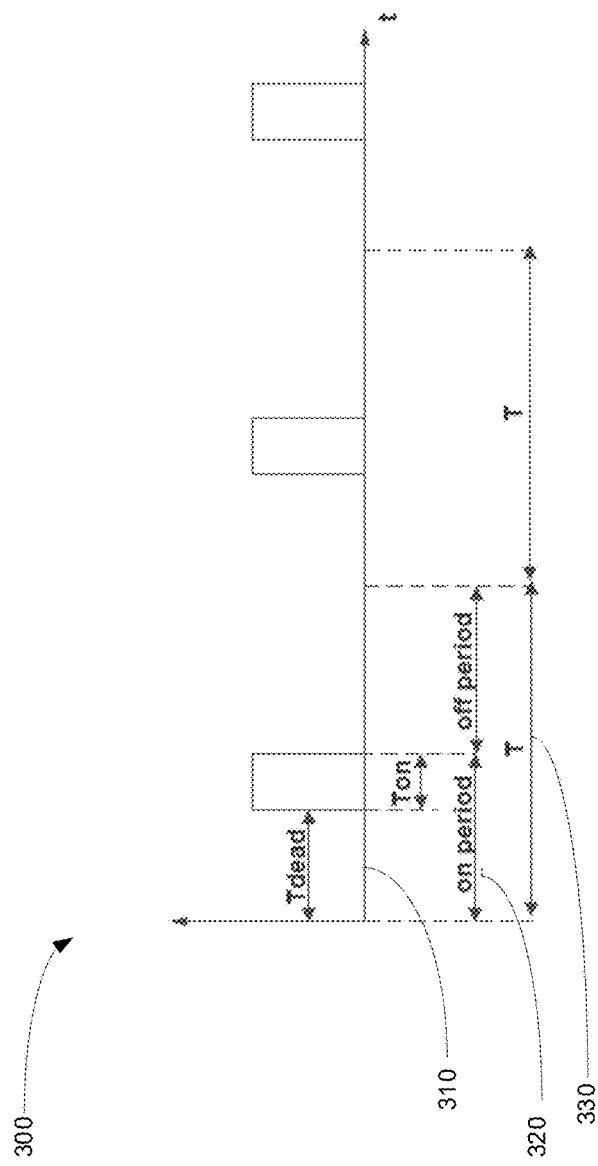
FIG. 3 is a graphical depiction of a standard switching pattern of the power switches of a resonant converter with a large dead time signal, according to another embodiment.

Referring to FIG. 3, a switching pattern 300 is shown with a dead time 310 as a part of the standard on-time 320, where the standard on time 320 of the resonant converter is equal to half of the switching period 330. Power switches are off during the dead time 310.

With the introduction of dead time 310, the normalised (to the switching period) conduction time of the switches becomes lower than the standard on time 320 of 0.5T, as seen in the following equation:

$$NCT=(0.5T-T_{dead})/T=0.5-T_{dead}/T$$

where Tdead is the turn-on dead-time 310 and T is the switching period 330.

The switching frequency is equal to 1/T, with T being the switching period 330. Looking at the equation for NCT, if the dead time 310 is fixed, a larger switching period 330 T (lower switching frequency) may result in a higher NCT. A smaller switching period 330 T (higher switching frequency) may result in a smaller NCT.

When the switching frequency is high enough so that the switching period is equal to 2Tdead (i.e. Tdead=0.5T), then from the equation above, the NCT goes to zero. Theoretically, the NCT going to zero means zero energy being transferred to the load at the output of the resonant converter and the output voltage may be reduced to very low levels or even zero.

Using a large value for the dead time may provide a number of advantages over the existing art. For example, a very large dead time and a very low switching frequency may allow for reduced switching loss in power switches in a hard switching mode.

Another possible advantage of this dead time control method may be that the voltage control loop may remain operative, reducing a need for imposing high or low thresholds for the voltage. The output voltage may then be controlled smoothly, as in PFM mode.

The dead time control method may also be advantageous because it may be available for light current control of resonant converters used as battery chargers operating in float mode and achieves low ripple output current.

Using a large value for the dead time in resonant converters may also be advantageous due to its ease of implementation and simplicity in digital control system applications.

Prior to examining a system with dead time control, it may be useful to examine a system with a standard switching frequency, such as that shown in FIG. 1a. The resonant converter shown at 100 may be similar in many aspects and use similar components to a resonant converter using dead time control.

The resonant converter 100 may comprise a DC output port 105 for coupling to a load. The resonant converter 100 may be coupled to a DC input 125. Any suitable DC input and power supply may be used.

The resonant converter 100 may include a switching network 130 for generating a wave voltage, a resonant tank 135 and a output rectifier 140. The switching network 130 may be coupleable to a DC power source, such as the DC input 125. The output rectifier 140 may be coupled to the DC output port 105 and the resonant tank 135 may be positioned between and coupled to each of the switching network 130 and the output rectifier 140.

The switching network 130 of the resonant converter 100 may produce an alternating current (AC) using any suitable wave voltage for the resonant converter 100. In some embodiments, the switching network 130 may produce square wave voltages. Furthermore, in certain embodiments, the switching network 130 may use matching switching frequencies for multiple resonant converters connected in parallel.

Any suitable switching network 130 may be used. For example, in some embodiments, a full bridge switching network may be used. In certain embodiments, a half bridge switching network may be used.

Any suitable power switches 131 may be used as components of the switching network 130. For example, as shown in FIG. 1a, a group of Mosfets 131, 132, 133, 134 may be used to form the switching network 130.

Any suitable resonant tank 135 may be used. In some embodiments, the resonant tank 135 may be an Inductor Inductor Capacitor (LLC) resonant tank, making the system 100 an LLC resonant converter. However, the system 100 is not limited to being an LLC resonant converter. Other types of resonant tanks may be used, including without limitation, an Inductor Capacitor Capacitor (LCC) resonant tank or an Inductor Capacitor Inductor Capacitor (LCLC) resonant tank.

The resonant tank 135 may be coupled to the output rectifier 140 using any suitable type of coupling. In some embodiments, as shown in FIG. 1a, the resonant tank 135 may be coupled to the output rectifier 140 using a transformer 145. The primary winding 146 of the transformer 145 may be on the resonant tank 135 side for carrying current from the resonant tank 135 and the secondary winding 147 may be on the output rectifier 140 side for carrying current for the output rectifier 140.

The output rectifier 140 is for producing a DC output. The portion of the resonant converter 100 between the switching network 130 and the output rectifier 140 is, for the purposes of the present disclosure, the AC side of the resonant converter 100. The AC side may be split, for the purposes of the present disclosure, into the primary AC side, which comprises the resonant tank 135 and the primary winding 146 of the transformer 145 and the secondary AC side, which comprises the secondary winding 147 and the portion of the resonant converter 100 up to the output rectifier 140. In the present disclosure, the AC current that is input to the output rectifier 140 is referred to as the AC current.

Any suitable output rectifier 140 may be used. In some embodiments, a full bridge rectifier may be used. In certain embodiments, a half bridge rectifier may be used. In other embodiments, a centre tap rectifier may be used.

Any suitable electrical components may be used as the components in the resonant converter 100. For example, where a resistor is used, any suitable resistor may be used made of any suitable material and manufactured using any suitable method. Similarly, any suitable electrical, and where used, magnetic, couplings may be used for the various couplings and connections in the resonant converter 100. For example, and without limitation, any suitable wires, traces and interconnects, made of any suitable materials, such as but not limited to, aluminum or copper, may be used.

Figure 1B:
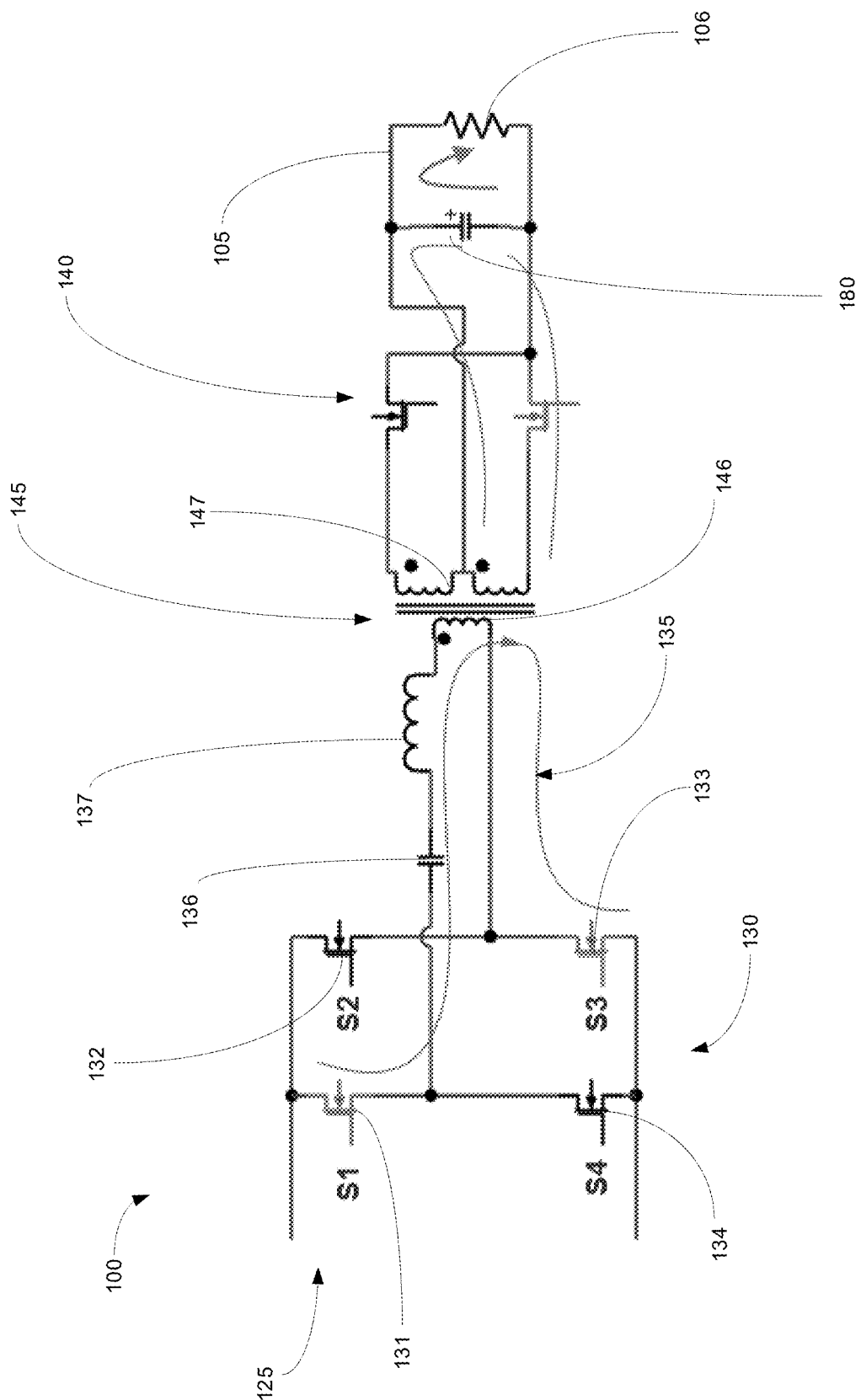
Figure 1C:
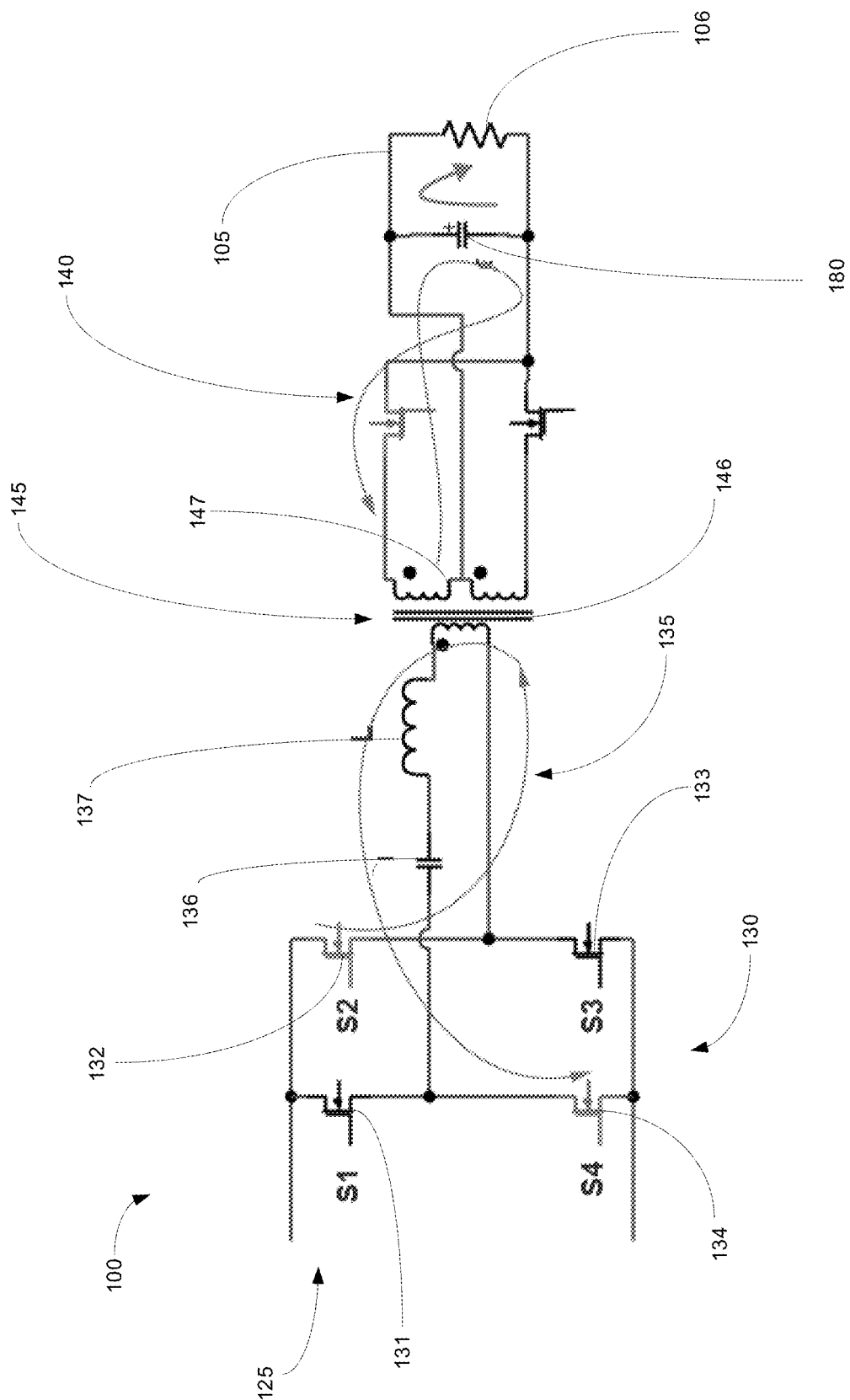
Figure 4:
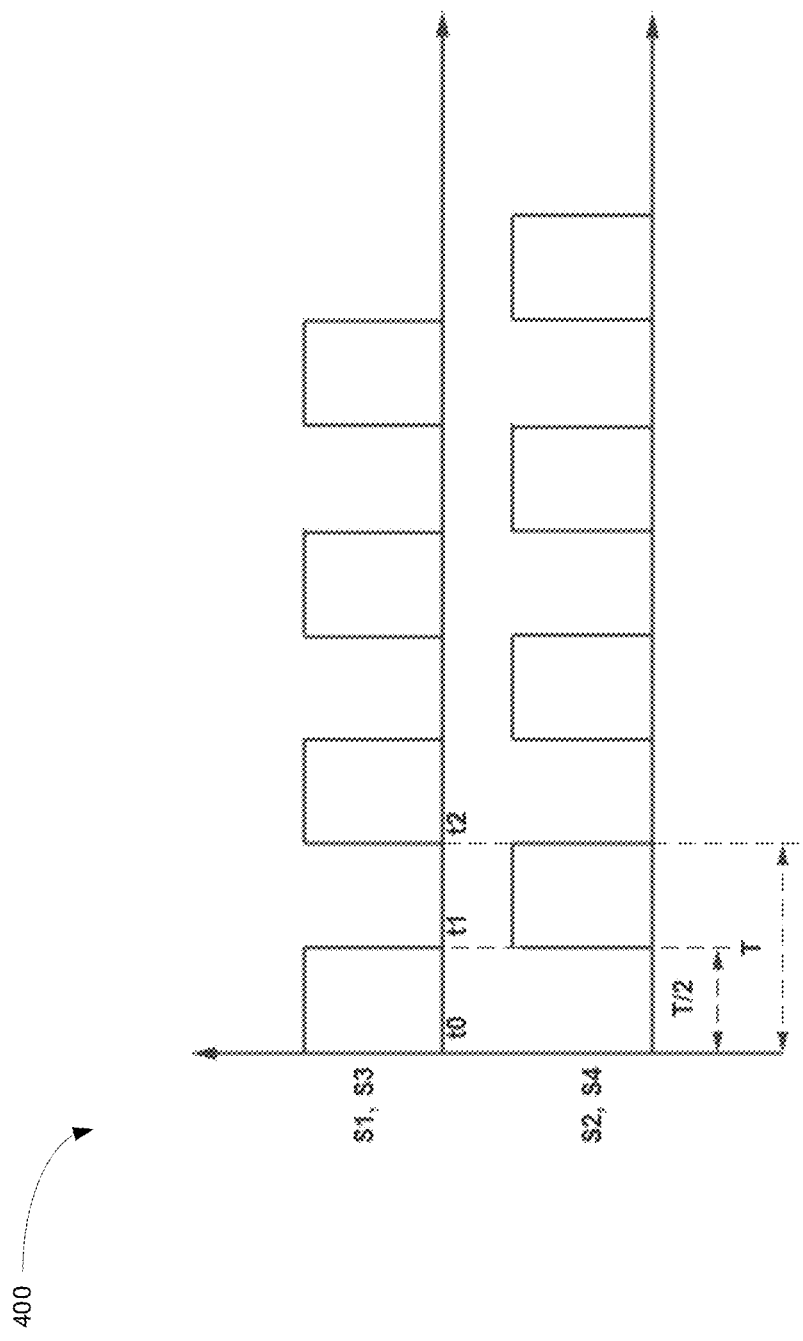

Referring to FIG. 4, a standard switching pattern of the Mosfets 131, 132, 133, 134 of the resonant converter 100 is shown at 400. The flow of current through the resonant converter 100 for the standard switching pattern 400 is shown in FIG. 1b and FIG. 1c. Referring now to FIG. 1b and FIG. 4, with the standard switching pattern, during the time interval 410 from t0 to t1, Mosfets 131 and 133 are turned on. Current may flow from the input 125 through a resonant capacitor 136 and a resonant inductor 137 of the resonant tank 135 and to a primary winding 146 of a transformer 145. Energy may be transformed to the secondary winding 147 due to the current flow through the primary winding 146, thereby charging an output capacitor 180 and supplying power to an output load 106.

Referring now to FIG. 4 and FIG. 1c, during the time interval 320 from t1 to t2, Mosfets 132 and 134 may be turned on. Current may flow through the resonant tank 135 to the primary winding 146 of the transformer 145, thereby transferring energy to the secondary winding 147 of the transformer 145 and charging the output capacitor 180 and powering the output load 106.

Figure 5A:
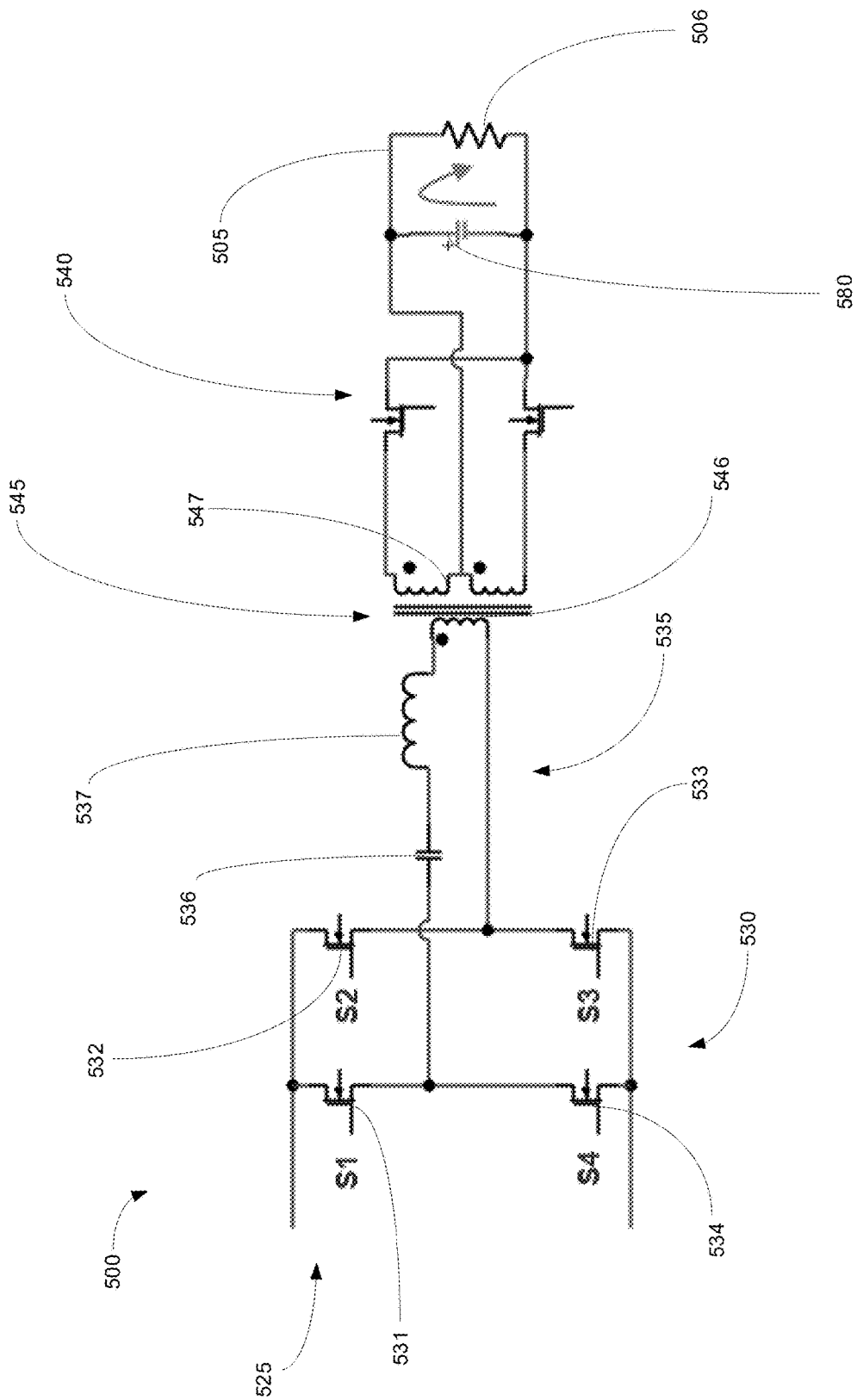
FIG. 5a is a circuit diagram of a resonant converter system with large dead time power switches during a period where the switches are in the dead time, in accordance with one embodiments.
Figure 5B:
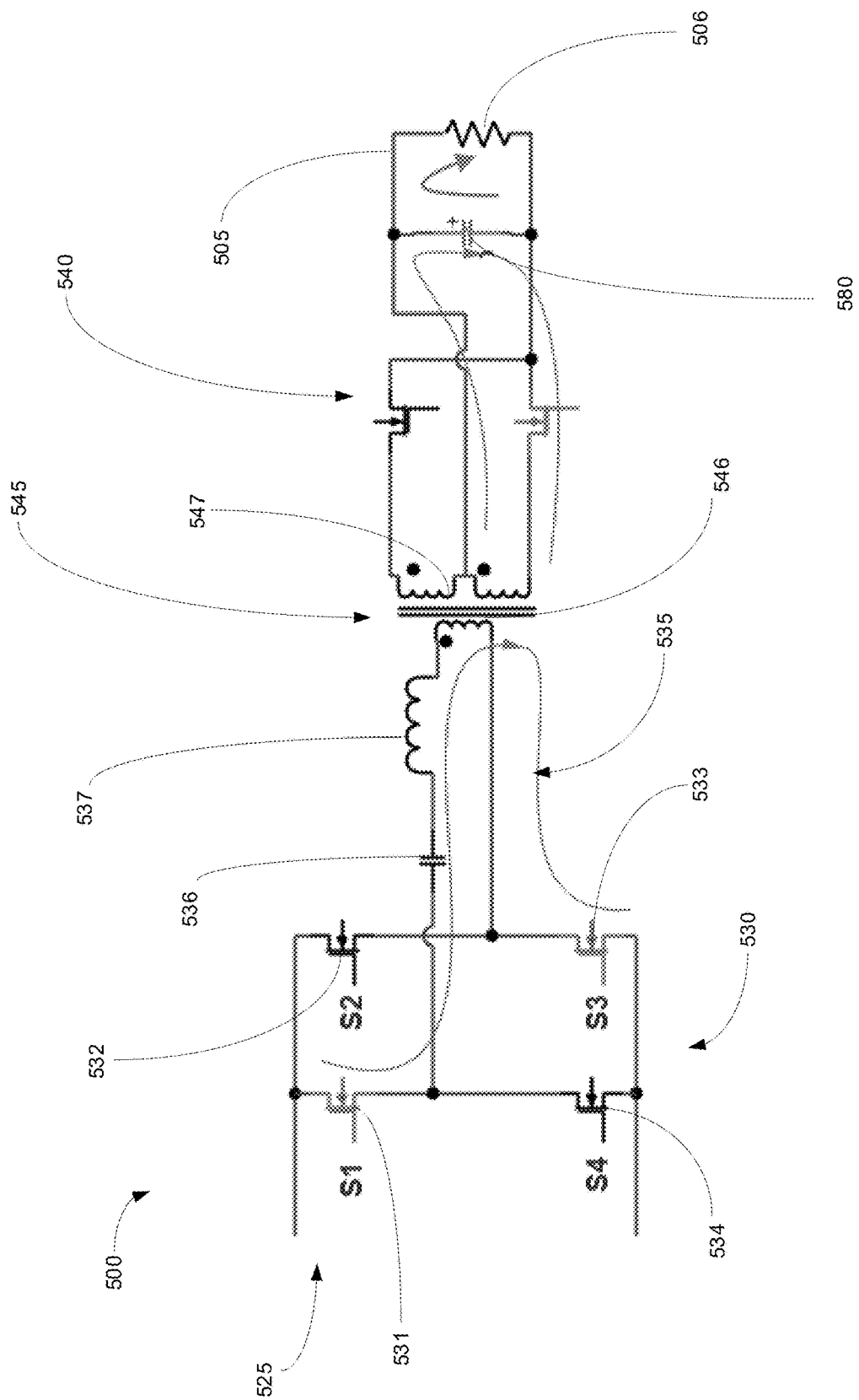
FIG. 5b is a circuit diagram of the resonant converter system of FIG. 5a depicting current flow during another interval of the switching period.
Figure 5C:
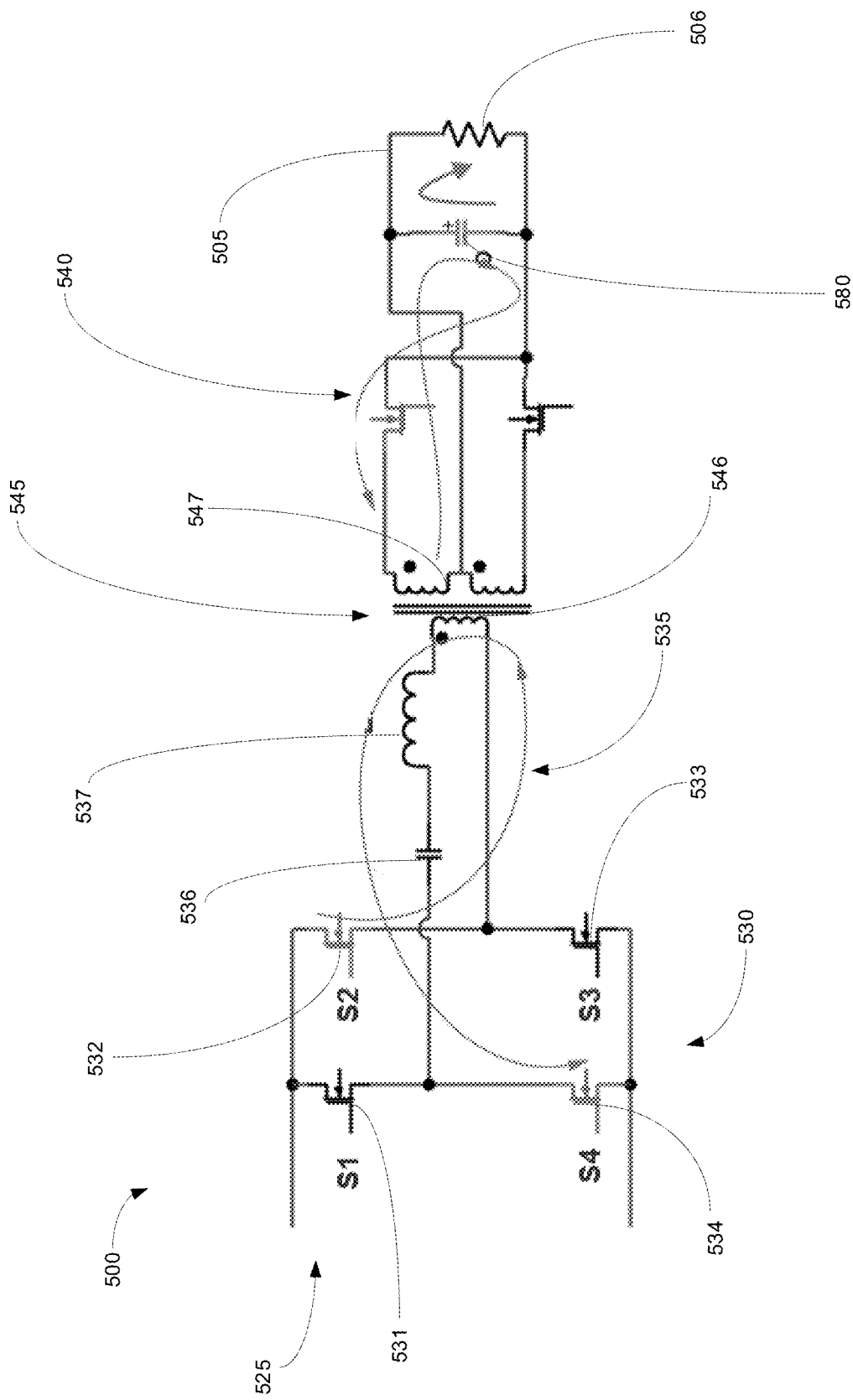
FIG. 5c is a circuit diagram of the resonant converter system of FIG. 5a depicting current flow during a different interval of the switching period.

Referring to FIGS. 5a, 5b and 5c, an embodiment of a resonant converter system with dead time control is shown at 500. In some embodiments, the resonant converter system 500 may use fixed large dead time values for controlling output voltage during a light load condition. The resonant converter system 500 may include a DC output port 505 for coupling to a light load 506. Any suitable type of light load and DC output port may be used.

The resonant converter system 500 may also comprise a switching network 530 coupled to a DC input 525. The switching network 530 may generate a wave voltage. In some embodiments, the switching network 530 may be set to operate in a Pulse Frequency Modulation mode with a variable switching frequency that may approach a resonant frequency of the resonant converter 500. For example, in some embodiments, the variable switching frequency may approach a resonant frequency of about 100 kHz to 500 kHz.

As discussed for the switching network 130 shown in FIG. 1a, any suitable configuration may be used for the switching network 530. For example, in some embodiments, a full bridge topology may be used. In certain embodiments, a half bridge topology may be used.

The switching network 530 may comprise multiple power switches. For example, in the embodiments shown in FIG. 5a, the switching network 530 comprises four power switches 531, 532, 533, 534. The power switches 531, 532, 533, 534 may be any suitable type of power switch. For example, in some embodiments, the power switches 531, 532, 533, 534 may be Mosfets.

In certain embodiments, the power switches 531, 532, 533, 534 may have a controllable NCT and may be operable with a large dead time.

In some embodiments, the large dead time of the power switches 531, 532, 533, 534 may be sufficiently large such that power delivered to the secondary winding may be at a low power level. A low power level, in some embodiments, may be a power level that approaches or equals a zero-power level. A zero-power level has zero power.

In certain embodiments, the dead time of the power switches 531, 532, 533, 534 may be based on a comparison of a secondary resonant period and a switching period. During a light load or zero load condition, a resonant inductor 537 of the resonant tank 535 of the resonant converter system 500 may resonate with the resonant capacitor 536 of the resonant converter system 500. The secondary resonant period may be, in these embodiments, a period of a mutual resonance between the resonant inductor 537 and the resonant capacitor 536. In some embodiments, the secondary resonance period may be a period of a mutual resonance of the resonance tank 535. The switching period may be a minimal switching period that the resonant converter system 500 is designed for. For example, in certain embodiments, a switching period may be about 2 μs to 10 μs.

In certain embodiments, where the calculated secondary resonant period is longer than the switching period, the dead time may be set to a value equal to about half of the secondary resonant period, which may allow the power switches 531, 532, 533, 534 to operate with very low NCT and to deliver very low power to the output.

In certain embodiments, where the calculated secondary resonant period is longer than the switching period, the dead time may be set to a very low value equal to about 0.1 microseconds (μs), which may allow the power switches 531, 532, 533, 534 to work at a zero voltage switching condition at various load conditions.

In some embodiments, where the calculated secondary resonant period is shorter than the switching period, the dead time may be set a value sufficiently large such that the power switches 531, 532, 533, 534 may operate at a low switching frequency to achieve a minimum NCT. Operating the resonant converter system 500 with power switches with very large dead times, and at switching frequencies that are much lower than normal operating switching frequencies, may result in reduced switching losses in the power switches at this hard switching mode. In some embodiments, switching frequencies that are much lower than normal operating switching frequencies may be minimal switching frequencies for the resonant converter. For example, in some embodiments, the resonant converter may be designed to operate at switching frequencies between about 90 kHz and about 400 kHz. The normal operating frequency of the resonant converter may be, for example, about 130 to about 140 kHz. A minimal operating frequency in this embodiment might be at the low end of the range, at about 90 kHz, which is about 40% to 50% lower than the range of normal operating frequencies.

In certain embodiments, the dead time of the power switches 531, 532, 533, 534 may be greater than the lower of 700 nS or 10% of the period of a resonant frequency of the resonant tank.

Any suitable control system may be used for controlling the NCT of the power switches 531, 532, 533, 534. Various control systems are known in the art.

In some embodiments, the power switches 531, 532, 533, 534 may have an NCT that is set to half of the secondary resonant period if the secondary resonant period is longer than the switching period such that power switches 531, 532, 533, 534 are operable at a Zero Voltage Switching condition.

In certain embodiments, if the resonant period is shorter than the switching period, the dead time is set to a value sufficiently large such that the normalised conduction time of the power switches is equal to or less than half of the resonant period.

Referring again to FIG. 5a, the resonant converter system 500 may include the output rectifier 540. The output rectifier 540 may be for converting an AC voltage to an output DC voltage. The output rectifier 540 may be coupled to the DC output. Any suitable type of output rectifier and any suitable configuration of output rectifier may be used, as discussed for the output rectifier 140 of the resonant converter 100 in FIG. 1a.

The resonant converter system 500 may also include the resonant tank 535 positioned between and coupled to the switching network 530 and the output rectifier 540. The resonant tank 535 may have a resonant frequency.

Any suitable components be part of the resonant tank 535. For example, in some embodiments, an inductor 536 and a capacitor 537 connected in series may form the resonant tank 535. As provided for in the discussion of the resonant tank 135 in FIG. 1a, any suitable configuration may be used for the resonant tank 535, including, without limitation, LC, LLC, LCC, and LCLC configurations.

The resonant converter system 500 may also include a transformer 545 positioned between the resonant tank 535 and the output rectifier 540. The transformer 545 may have a primary winding 546 coupled to the resonant tank 535 and a secondary winding 547 coupled to the output rectifier 540 for delivering power to the output rectifier 540. In some embodiments, energy may be transferred from the primary winding 546 to the secondary winding 547. Any suitable type of transformer 545 may be used.

In certain embodiments, power delivered to the secondary winding 547 is variable due to the normalised conduction time of the power switches 531, 532, 533, 534 varying inversely with the switching frequency.

Figure 6:
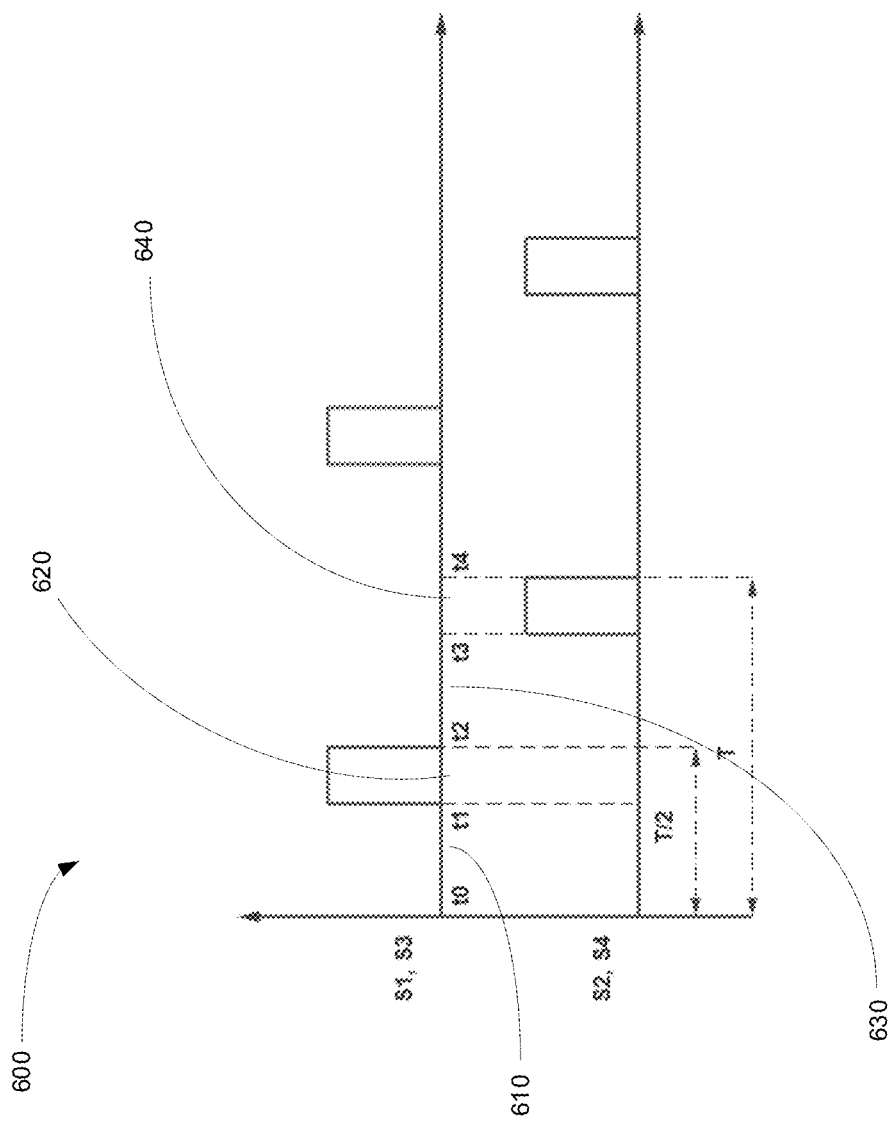
FIG. 6 is a graphical depiction of a switching pattern for a resonant converter system incorporating power switches with large dead time.

Referring to FIG. 6, a switching pattern 600 for the resonant converter system 500 of FIG. 5a is shown for a light load or zero-load condition. A fixed, large dead time signal may be applied to the gates of the power switches 531, 532, 533, 534 while the resonant converter operates in PFM mode such that the output voltage may be regulated by varying the switching frequency.

During a first time interval 610 from t0 to t1, all of the power switches 531, 532, 533, 534 are turned off and there may be no energy transfer to the secondary winding 547. The output capacitor 580 may discharge through the load 506.

During a second time interval 620 from t1 to t2, two power switches 531, 533 will be turned on and, as shown in FIG. 5b, energy may be transferred to the load 506.

During a third time interval 630 from t2 to t3, all of the power switches 531, 532, 533, 534 will be off and, as depicted in FIG. 5a, there may be no energy transfer to the secondary winding 547. The capacitor 580 may discharge through the output load 506.

During a fourth time interval 640 from t3 to t4, two power switches 532, 534 will be turned on and, as depicted in FIG. 5c, energy may be transferred to the secondary winding 547 and to the output load 506.

Increasing the dead time may increase the time available for the output capacitor 580 to discharge through the output load 506, while the time available for the output capacitor 580 to charge from the input source 510 may decrease. As a result, the voltage across the output capacitor 580, which is equal to the output voltage, may decrease. In the extreme case where the dead time is sufficiently large, compared with a half of the switching period, such that the second time interval 620 approaches zero (t2–t1 approaches zero), energy transfer to the secondary winding 547 and the output voltage may approach zero as well.

Figure 7:
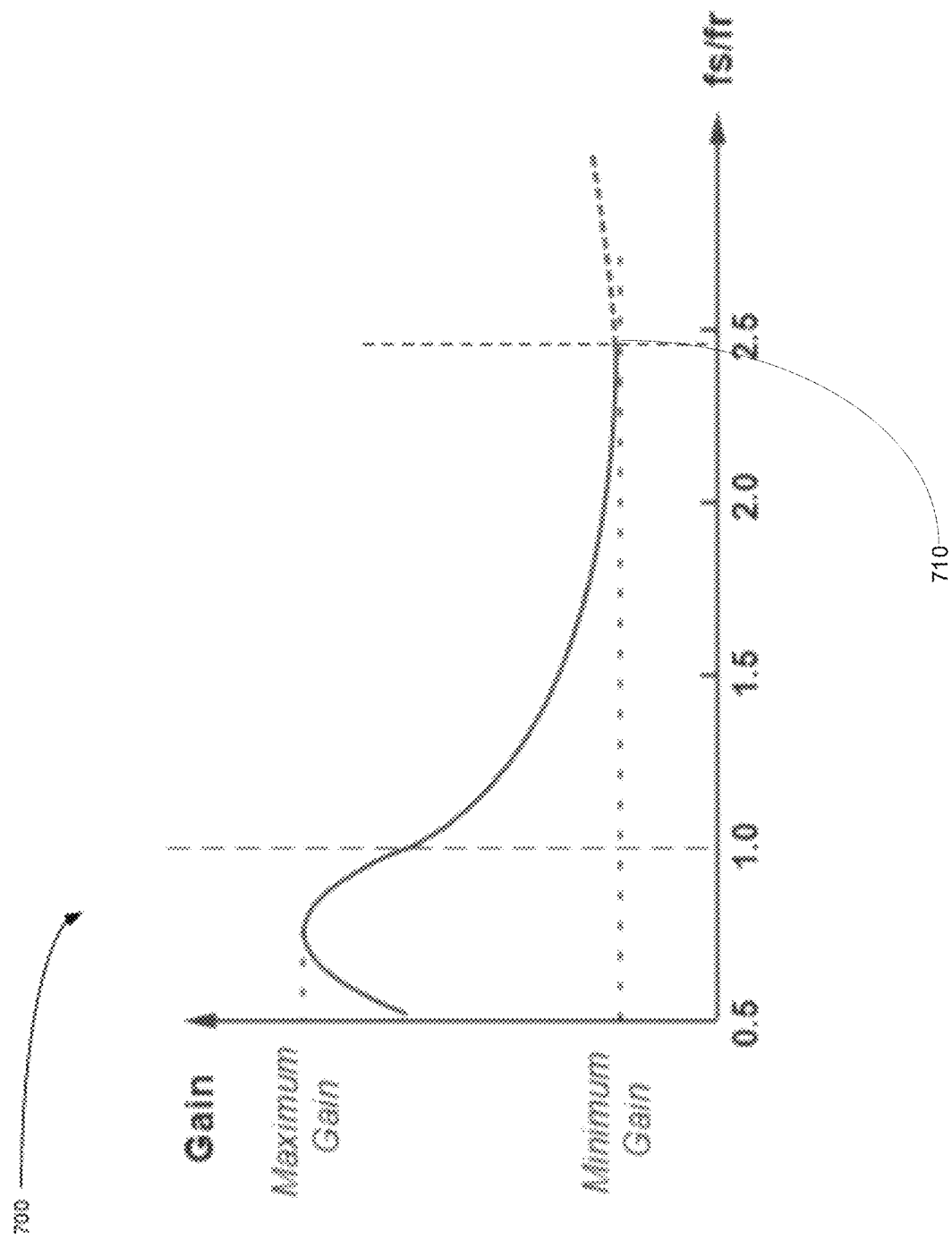
FIG. 7 is a graph of DC gain versus the ratio of switching frequency and resonant frequency, according to one embodiment.

The effect of using a resonant converter system that incorporates power switches with dead time control may be seen from the DC gain of the resonant converters. Referring to FIG. 7, a graph of DC gain versus fs/fr (where fs is the switching frequency and fr is the resonant frequency) is shown at 700 for a resonant converter 100 using power switches with a standard switching pattern, such as the standard switching pattern 400 shown in FIG. 4. The ratio fs/fr is a ratio of a switching frequency and resonant frequency of the resonant converter. When the resonant converter 100 operates in a PFM mode, its DC gain remains greater than zero even for very high values of the switching frequency.

An inflection point 710 may, in some embodiments, represent a practical maximum switching frequency of the resonant converter operating at a light load or zero load condition. The DC gain may increase beyond the inflection point 710 due to parasitic capacitances and inductances. Parasitic capacitors of the output rectifiers and of the transformer may store an increasing amount of energy as the frequency increases. In some embodiments, at some frequency point, the parasitic effect may become dominant over the effect of the PFM control and cause an increase in the output voltage. The inflection point 710 of the DC gain may be a practical maximum frequency of the resonant converter at a zero or light load condition. Increasing the frequency with PFM control may not be useful due to the DC gain increasing past the inflection point 710.

In embodiments with a load, the load may discharge the parasitic capacitances and inductances. Therefore, the DC gain may continue to decrease.

The practical maximum switching frequencies and ranges of frequencies and corresponding switching periods may be dependent on the underlying material and device technology. As device technology and materials technology improves, maximum practical switching frequencies may increase.

A practical minimum switching frequency may be slightly higher than the resonant tank frequency for maintaining the ZVS. The resonant tank frequency in turn may depend on design factors. For example, in some embodiments, the resonant tank frequency may depend in part on a form factor and power efficiency of the resonant converter. Form factor may relate to the size of the resonant converter. Generally, the smaller the resonant converter, the higher the resonant tank frequency. In terms of power efficiency, the higher the power efficiency requirements, the lower switching frequency may be due to switching losses in semiconductors and power losses in magnetic components reducing power efficiency. The minimum switching frequency for a given resonant converter may be determined as a compromise between form factor and power efficiency.

Any suitable switching frequencies may be used. For example, at the current state of technology, in some embodiments, power switches with large dead times may be used with resonant converters with switching frequencies ranging between about 50 kHz and 1 MHz (with corresponding periods between 1 µs and 20 µs. In certain embodiments, resonant converters may operate between about 100 kHz and 500 kHz.

Figure 8:
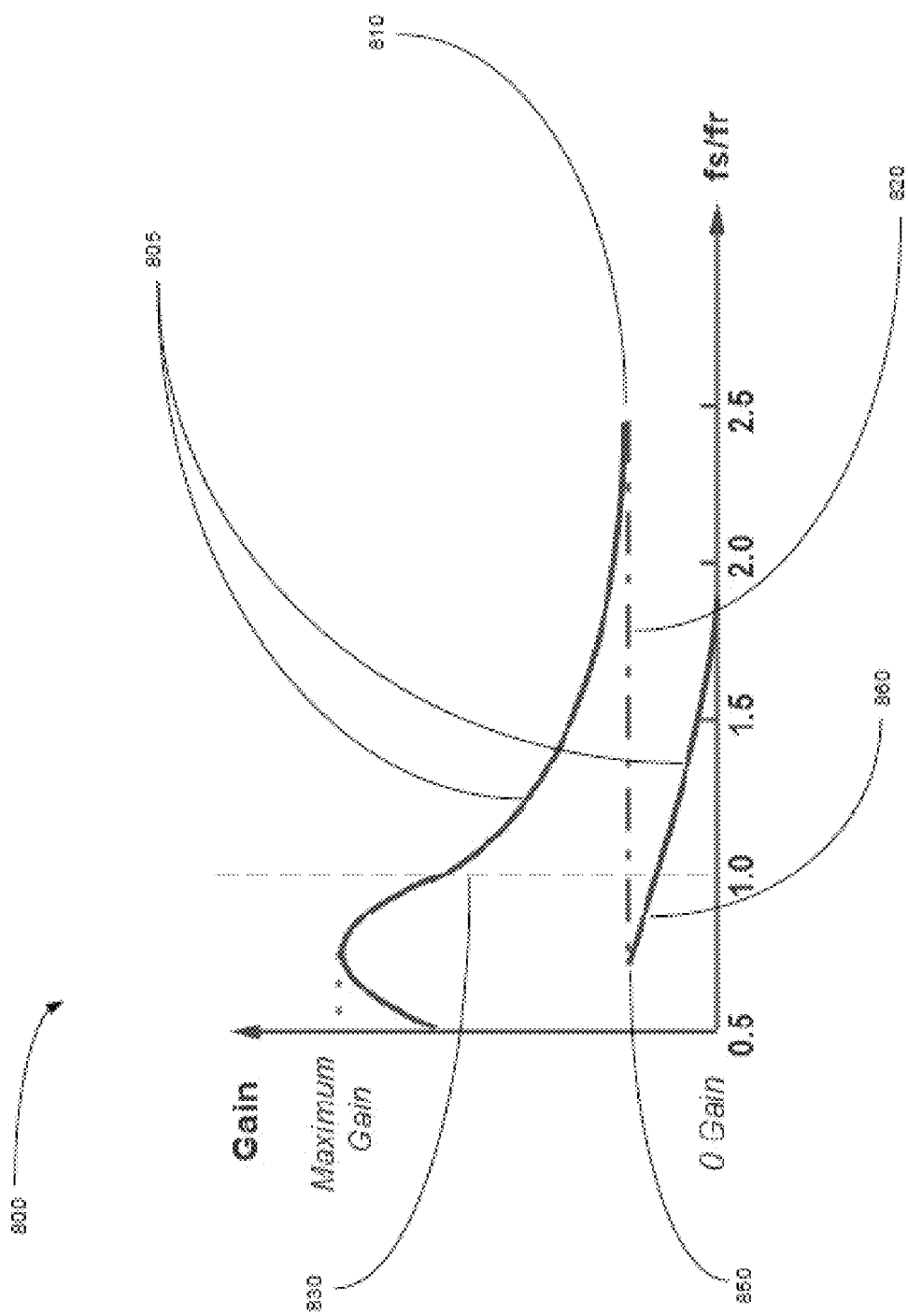
FIG. 8 is a graph of DC gain versus the ratio of switching frequency and resonant frequency for a resonant circuit with a large dead time, according to one embodiment.

Referring to FIG. 8, a graph of DC gain versus fs/fr is shown at 800 for a resonant converter that incorporates power switches with a large dead time, such as the resonant converter 500 in FIG. 5a. With the introduction of large dead time, the DC gain of the resonant converter system 500 operating in PFM may be brought to zero or close to zero.

The intersection point 810 of the dotted line 820 and the top portion 830 of the DC gain curve 805 indicates an fs/fr value at which the resonant converter 500 switches from a standard PFM mode to a large dead time PFM mode. The intersection point 850 of the dotted line 820 and the bottom portion 860 of the DC gain curve 805 indicates a lower fs/fr value at which the resonant converter 500 begins operation in a large dead time PFM mode.

The transition from a standard PFM mode to a large dead time PFM mode may be accompanied with a transition from a high to a low switching frequency. This transition may be advantageous because the large dead time operation features higher than the zero-voltage switching loss in the power switches (hard switching). Reducing the switching frequency may then be beneficial for reducing this loss.

Figure 9:
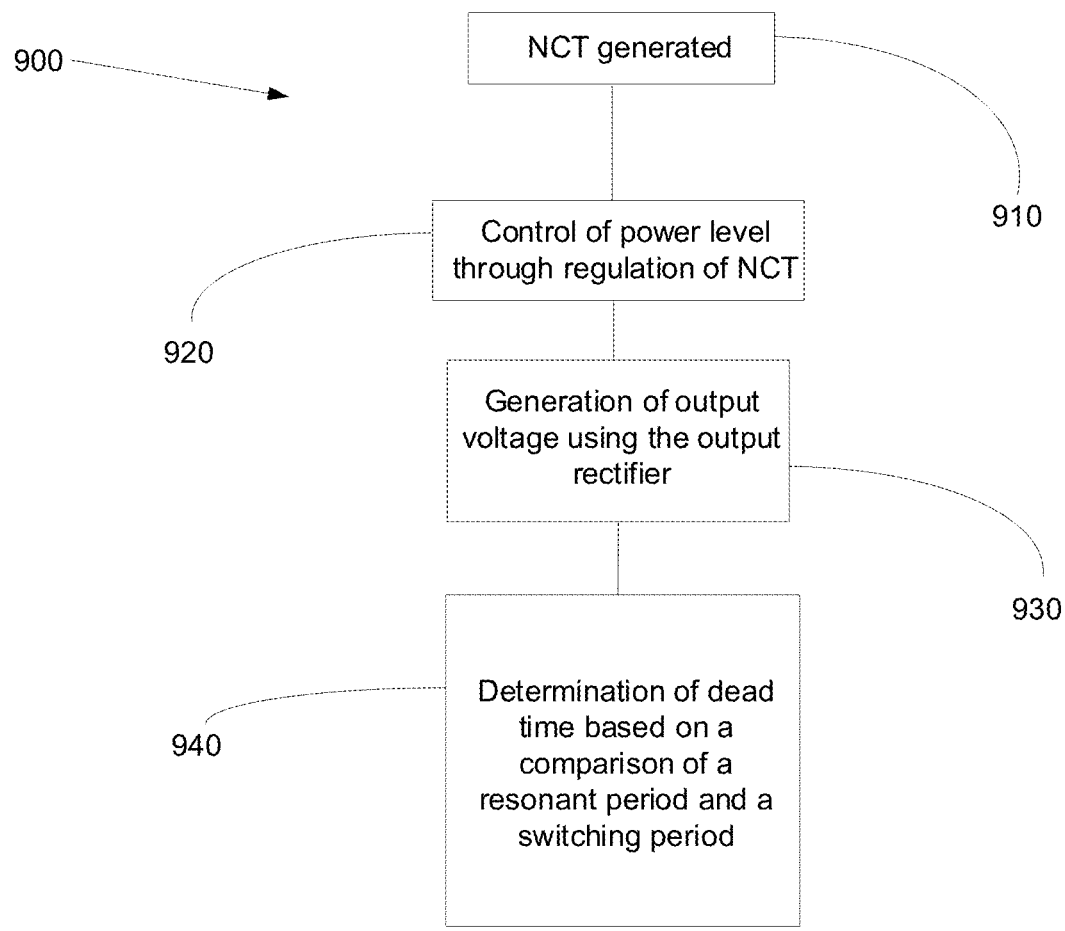
FIG. 9 shows a method for controlling an output voltage of a resonant converter during a light load condition, according to one embodiment.

Referring to FIG. 9, a method for controlling an output voltage of a resonant converter during a light load condition is shown at 900. At box 910, a normalised conduction time of the resonant converter is generated that varies inversely with a switching frequency of the resonant converter by continuing to operate the resonant converter in a Pulse Frequency Modulation mode at a low switching frequency that is similar to a resonant frequency of a resonant network of the resonant converter.

At box 920, a power level delivered to a secondary winding of a transformer positioned between a resonant tank and an output rectifier of the resonant converter is controlled by regulating the normalised conduction time, wherein the delivered power level is variable based on load conditions.

At box 930, an output voltage may be generated using the output rectifier wherein the magnitude of the output voltage may correspond to the power level delivered to the secondary winding. In some embodiments, the correspondence may be a non-linear direct variation. For example, the output voltage may increase if the power level delivered to the secondary winding increases. The increase may be non-linear.

At box 940, the dead time may be determined based on a comparison of a resonant period and a switching period. The resonant period may be a period of a mutual resonance between a resonant inductor and the resonant capacitor of the resonant converter and the switching period may be a large switching period. In some embodiments, the switching period may be a maximum switching period for the resonant converter. As discussed earlier for maximum and minimum practical switching frequencies, maximum switching periods may depend on various factors, including parasitic inductances and capacitances as well as form factors and power efficiencies of the resonant converter. The current technological state of the devices and materials may determine the range of switching frequencies used.

Any suitable switching periods may be used. For example, in some embodiments, the resonant converter may be operable with switching periods between about 1 µs and 20 µs.

In some embodiments, the dead time may be set to half of the resonant period for letting the power switches work at low power delivery to the load. In some embodiments, low power delivery to the load may be a minimum power delivery to the load. In certain embodiments, the power delivery to the load may approach zero.

In certain embodiments, the dead time may be set at a fixed value, wherein the fixed value may be the lower of 700 ns or 10% of the period of the resonant frequency of the resonant tank.

In some embodiments, increasing the switching frequency may decrease the normalised conduction time and decreasing the switching frequency may increase the normalised conduction time.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for controlling an output voltage of a resonant converter during a light load condition, the method comprising:
   (a) generating a normalised conduction time of power switches of the resonant converter that varies inversely with a switching frequency of the resonant converter by continuing to operate the resonant converter in a Pulse Frequency Modulation mode with the switching frequency similar in magnitude to a resonant frequency of the resonant converter, while increasing a dead time of the power switches of the resonant converter to a point where power delivered to a secondary winding of the resonant converter is at a low power level;
   (b) controlling a power level delivered to a secondary winding of a transformer positioned between a resonant tank and an output rectifier of the resonant converter by regulating the normalized conduction time of the power switches, wherein the delivered power level is variable based on load conditions; and (c) generating the output voltage using the output rectifier wherein a magnitude of the output voltage corresponds to the power level delivered to the secondary winding;

(d) determining the dead time based on a comparison of a resonant period and a switching period, wherein the resonant period is a period of a mutual resonance of the resonant tank of the resonant converter and the switching period is a maximum switching period of the resonant converter.

2. The method of claim 1 wherein the normalised conduction time is set to half of the resonant period if the resonant period is longer than the switching period for letting the power switches work at a Zero Voltage Switching condition.

3. The method of claim 1 wherein if the resonant period is shorter than the switching period, the normalized conduction time is set to a value sufficiently large such that the power switches remain operable when the switching frequency is as low as the resonant frequency.

4. The method of claim 1 wherein the dead time is set at a fixed value which is greater than the lower of 700 nS or 10% of a period of the resonant frequency of the resonant tank.

5. The method of claim 1 wherein the low power level comprises a zero-power level.

6. The method of claim 1 wherein increasing the switching frequency decreases the normalised conduction time and decreasing the switching frequency increases the normalized conduction time.

7. The method of claim 1 wherein a zero normalized conduction time is achievable at a switching frequency period that is approaching or about equal to twice the dead time.

8. A resonant converter system for providing a controllable output voltage during a light load condition, the resonant converter system comprising:

(a) a DC output port for coupling to a load;

(b) a switching network comprising power switches, the power switches having a controllable normalized conduction time and operable with a large dead time, the switching network coupled to a DC input for generating a wave voltage and set to operate in a Pulse Frequency Modulation mode with a variable switching frequency that approaches a resonant frequency of the resonant converter;

(c) an output rectifier for converting an AC voltage to an output DC voltage, the output rectifier coupled to the DC output;

(d) a resonant tank positioned between and coupled to the switching network and the output rectifier, the resonant tank having the resonant frequency;

(e) a transformer positioned between the resonant tank and the output rectifier, the transformer having a primary winding coupled to the resonant tank and a secondary winding coupled to the output rectifier for delivering power to the output rectifier;

wherein power delivered to the secondary winding is variable due to the normalized conduction time of the power switches varying inversely with the switching frequency and wherein the dead time of the power switches is based on a comparison of a secondary resonant period and a switching period, wherein the secondary resonant period is a period of a mutual resonance of the resonant tank of the resonant converter and the switching period is a maximum switching period of the resonant converter.

9. The resonant converter system of claim 8 wherein the large dead time of the power switches is sufficiently large such that power delivered to the secondary winding is at a low power level.

10. The resonant converter system of claim 8 wherein the dead time is greater than the lower of 700 nS or 10% of a period of the resonant frequency of the resonant tank.

11. The resonant converter system of claim 8 wherein the normalized conduction time is set to half of the secondary resonant period if the secondary resonant period is longer than the switching period such that power switches are operable at a Zero Voltage Switching condition.

12. The resonant converter system of claim 8 wherein if the secondary resonant period is shorter than the switching period, the dead time is set to a value sufficiently large such that the normalized conduction time of the power switches is equal or lower than a half of the secondary resonant period.

13. The resonant converter of claim 9 wherein the low power level comprises a zero power level.

14. The resonant converter system of claim 8 wherein the resonant converter system comprises at least one of an LLC resonant converter, an LCC resonant converter and an LCLC resonant converter.

* * * * *